United States Patent
Mizrahi et al.

(10) Patent No.: US 6,614,959 B1
(45) Date of Patent: Sep. 2, 2003

(54) METHODS OF WRITING APODIZED FIBER GRATINGS AND ASSOCIATED APPARATUSES

(75) Inventors: Victor Mizrahi, Annapolis, MD (US); Jean-Luc Archambault, Severna Park, MD (US)

(73) Assignee: Ciena Corporation, Linthicum, MD (US)

( * ) Notice: Subject to any disclaimer, the term of this patent is extended or adjusted under 35 U.S.C. 154(b) by 332 days.

(21) Appl. No.: 09/627,900

(22) Filed: Jul. 27, 2000

(51) Int. Cl.$^7$ ................................................ G02B 6/34
(52) U.S. Cl. ........................................................ 385/37
(58) Field of Search ............................. 385/24, 37, 10, 385/123; 359/563, 566, 569, 575

(56) References Cited

U.S. PATENT DOCUMENTS

| | | | |
|---|---|---|---|
| 5,309,260 A | | 5/1994 | Mizrahi et al. ............... 359/3 |
| 5,388,173 A | * | 2/1995 | Glenn ......................... 385/37 |
| 5,668,901 A | * | 9/1997 | Keck et al. .................. 385/37 |
| 5,822,479 A | * | 10/1998 | Napier et al. ................ 385/37 |
| 6,310,996 B1 | * | 10/2001 | Byron ......................... 385/37 |
| 6,347,171 B1 | * | 2/2002 | Tatah et al. .................. 385/37 |
| 2002/0031302 A1 | * | 3/2002 | Kim ............................ 385/37 |

FOREIGN PATENT DOCUMENTS

WO          9808120          2/1998

OTHER PUBLICATIONS

Marmeet Singh, et al., "Apodized Fiber Bragg Gratings for DWDM Applications Using Uniform Phase Mask," ECOC, 98.

J.A.R. William, et al., "The Design of In–Fiber Bragg Grating Systems for Cubic and Quadratic Dispersion Compensation," Optics Communications, vol. 116, pp. 62–66, 1995.

K. Sugden, et al., "Fabrication and Characterization of Bandpass Filters Based on Concatenated Chirped Fiber Gratings," Journal of Lightwave Technology, vol. 15, No. 8, pp. 1424–1432, 1997.

M.C. Farries, et al., "Very Broad Reflection Bandwidth (44nm) Chirped Fibre Gratings and Narrow Bandpass Filters Produced by the Use of an Amplitude Mask," Electronics Letters, vol. 30, No. 11, pp. 891–892, 1994.

Morten Ibsen, et al., "High Reflectivity Linear–Phase Fibre Bragg Gratings," Southampton Photonics, pp. 1–4, Jan., 2000.

* cited by examiner

*Primary Examiner*—Hemang Sanghavi
(74) *Attorney, Agent, or Firm*—Daniel N. Daisak; Susan S. Morse

(57) ABSTRACT

An optical waveguide having a refractive index variation is formed by interfering two beams thereon and varying a fringe contrast of the interference pattern. This variation in fringe contrast may be provided by controlling the relative polarizations of the two interfering beams or the relative intensities of the two interfering beams. Preferably, a substantially constant total intensity is provided to the waveguide during the variation in fringe contrast.

17 Claims, 3 Drawing Sheets

METHODS OF WRITING APODIZED FIBER GRATINGS AND ASSOCIATED APPARATUSES

BACKGROUND OF THE INVENTION

1. Field of the Invention

The present invention is directed to forming an optical waveguide grating having a refractive index variation, more particularly to an apodized fiber grating, by varying a fringe contrast of an interference pattern used to expose the waveguide along the waveguide.

2. Description of Related Art

A fiber grating is a modulation of the refractive index of a fiber. An interference pattern of ultraviolet (UV) radiation forms this modulation by locally increasing the index of the fiber core. This interference pattern, and thus the resulting modulation, generally has both a DC and an AC component. The AC component has a submicron periodicity and causes the grating to reflect light at a particular wavelength. The DC component is generally unwanted and causes the grating to be "chirped", i.e., the grating wavelength varies along the length of the grating.

For wavelength division multiplexing (WDM) applications, fiber gratings are ideally "purely apodized", i.e., the AC component has a smoothly varying envelope, e.g., a Gaussian envelope, and the DC component is uniform along the whole length of the grating. FIG. 1A illustrates the index modulation of a grating having an AC component with a Gaussian envelope and a DC component which is also a Gaussian function. FIG. 1B illustrates the index modulation of a grating having an AC component with a Gaussian envelope and a DC component which is constant.

The Gaussian variation or chirp of the DC component of the grating with the index modulation shown in FIG. 1A results in a grating reflection spectrum, shown in FIG. 2A, which is strongly asymmetric, with sidelobes on the short wavelength side. In contrast, the grating having the uniform DC component shown in FIG. 1B has a symmetric reflection spectrum and very low sidelobes. This symmetric wavelength response results in improved filtering performance.

Several methods have been proposed to produce purely apodized gratings. The simplest method of apodizing a grating involves spatially varying the intensity of a beam being used to write to a fiber. This is typically achieved using an interferometer or a phase mask, as discussed below. One such method of spatially varying a beam intensity to form an apodized grating is a double exposure method, in which a fiber is exposed twice to raise the average index of the fiber. This double exposure may be performed either sequentially, as set forth in U.S. Pat. No. 5,309,260 to Mizrahi et al., entitled "Method for Forming Distributed Bragg Reflectors in Optical Media" or simultaneously, as set forth in H. Singh and M. Zippin, "Apodized Fiber Gratings for DWDM Applications using Uniform Phase Mask", European Conference on Optical Communications Proceedings, 1998. In either scenario, the second exposure does not interfere with the first exposure, i.e., produce fringes, but merely alters the refractive index profile.

Another method for making a purely apodized grating is the use of an apodized phase mask to create the grating, as discussed, for example, in L. E. Erickson et al. "Fabrication of a Variable Diffraction Efficiency Phase Mask by Multiple Dose Ion Implantation," J. of Vac. Sci. Tech. B 13(6), pp.2940–3, November 1995. This results in a constant average index of refraction along the grating, while the index modulation at the ends of the grating approaches zero. This apodized phase mask approach lacks flexibility, since a different phase mask is required for every different grating wavelength or apodization profile.

Yet another method for making a purely apodized grating involves moving the phase mask and the fiber relative to one another during scanning by a beam. In this techniques, apodization is achieved by dithering the relative phase between the phase mask and the fiber at the edges of the grating, as set forth, for example in R. Kashyap et al., Electronics Letters, Vol. 32 (15), pp. 1394–6, 1996. While this technique alone is limited to the length of available phase masks, longer gratings can be made by scanning several such masks, while trimming the discontinuities between sections, as disclosed in M. I. Cole et al., Electronics Letters, Vol. 31 (17), pp. 1488–9, 1995. Alternatively, longer gratings may be created by significantly overlapping the footprint of the writing light beam with previous lines to average the writing process, as set forth in PCT Application Number PCT/GB97/02099 to Laming et al., entitled "Fabricating Optical Waveguide Gratings" published on Feb. 26, 1998. While this technique is flexible, it is difficult to implement and requires expensive, accurate equipment.

SUMMARY OF THE INVENTION

The present invention is therefore directed to a method of creating apodized gratings which substantially overcomes one or more of the problems due to the limitations and disadvantages of the related art.

The above and other objects may be realized by exposing a fiber to ultraviolet (UV) interference patterns with a uniform average intensity, but with a varying fringe contrast.

At least one of the above and other objects may be realized by a method of fabricating an optical waveguide grating having a refractive index variation including providing a photosensitive optical waveguide, splitting input light into two beams, supplying the two beams to the photosensitive optical waveguide, exposing the photosensitive optical waveguide to an interference pattern formed by the supplying of the two beams, and varying a fringe contrast of the interference pattern along the photosensitive optical waveguide.

The varying may include altering a relative polarization between beams used to generate the interference pattern. The altering may include rotating a polarization of one of the beams used to generate the interference pattern.

The varying may include altering relative intensities of beams used to generate the interference pattern. The altering may include providing a mask having openings with sizes varying with position for each of the beams. The providing a mask may include creating a pair of masks includes generating a pair of masks designed to provide a substantially constant total intensity on the optical waveguide. The exposing may include providing a beam of uniform intensity to each of the masks.

The varying may include rotating a polarization of an input beam and using a polarizing beam splitter to split the input beam into beams used to generate the interference pattern. The varying may further include controlling said rotating such that the relative intensities of the beams used to generate the interference patter are related as follows:

$$I_1(z) = \tfrac{1}{2}(1 \pm \sqrt{1-C(z)^2})$$

$$I_2(z) = \tfrac{1}{2}(1 \mp \sqrt{1-C(z)^2})$$

where z is a position along the waveguide, I (z) is the intensity of a beam used to generate the interference pattern at a position z, and C(z) is a desired contrast function.

The varying includes rotating a polarization of an input beam, deflecting a portion of the input beam having a first polarization from a portion of the input beam having a second polarization orthogonal to the first polarization, and amplitude splitting the input beam into the beams used to generate the interference pattern. The varying may further include controlling the rotating such that the relative intensities of the beams used to generate the interference patter are related as follows:

$$I_1(z) = \frac{1}{2}(1 \pm \sqrt{1-C(z)^2})$$

$$I_2(z) = \frac{1}{2}(1 \mp \sqrt{1-C(z)^2})$$

where z is a position along the waveguide, I (z) is the intensity of a beam used to generate the interference pattern at a position z, and C(z) is a desired contrast function.

The exposing may include scanning a beam along the photosensitive optical waveguide. The varying may include altering a relative polarization between beams used to generate the interference pattern simultaneously with the scanning to generate a desired grating. The varying may include altering relative intensities of beams used to generate the interference pattern in accordance with the scanning to generate a desired grating.

The above and other objects may be realized by providing an optical waveguide grating made by any of the above methods.

The above and other objects may further be realized by providing an apparatus for fabricating an optical waveguide grating including a splitter which splits input light into two beams to be delivered to an optical waveguide to form an interference pattern thereon and a fringe contrast varying system which alters a fringe contrast of the interference pattern along the optical waveguide to create a desired contrast function.

The fringe contrast varying system may include a scanner which scans the input light along the optical waveguide, a rotatable polarizer which alters a polarization of one of the two beams relative to the other, and a controller which adjusts a polarization presented by the rotatable polarizer in accordance with the position of the input light and the desired contrast function.

The fringe contrast varying system may include a scanner which scans the input beam along the optical waveguide, a rotatable polarizer which alters a polarization of the input beam, and a controller which adjusts a polarization presented by the rotatable polarizer in accordance with the position of the input light and the desired contrast function, wherein the splitter is a polarizing beam splitter.

When the splitter splits the input light into two beams of substantially equal amplitude, the fringe contrast varying system may include a scanner which scans the input beam along the optical waveguide, a deflector which alters the optical path traversed by a portion of the input beam having a first polarization from a portion of the input beam having a second polarization, orthogonal to the first polarization, a rotatable polarizer which alters a polarization of the input beam, and a controller which adjusts a polarization presented by the rotatable polarizer in accordance with the position of the input light and the desired contrast function.

The fringe contrast varying system may include a pair of masks, one mask for each of the two beams, the masks providing a varying opening size along the optical waveguide, a total intensity output by the pair of masks being substantially constant. The fringe contrast varying system may further include a scanner which scans the input light along the optical waveguide. The input light may have a substantially uniform intensity along the optical waveguide.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIGS. 8A and 8B are alternative configurations for variation of fringe contrast using relative intensity control in accordance with the present invention.

DETAILED DESCRIPTION OF PREFERRED EMBODIMENTS

The present invention is directed to writing the gratings with a pattern of uniform intensity, but varying fringe contrast of two beams incident thereon, as opposed to the conventional spatially varying the intensity of the writing beam. This variation in fringe contrast may be provided in a number of manners, as set forth below. In particular, this variation may be controlled by controlling the relative polarizations of the two interfering beams or the relative intensity of the two interfering beams.

Polarization Control

Figure 1A:
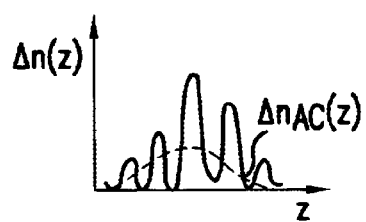
FIG. 1A is a plot of index modulation for a chirped grating.
Figure 1B:
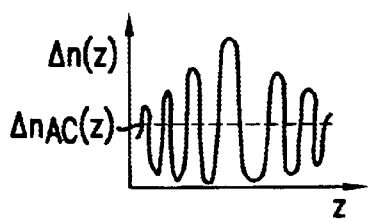
FIG. 1B is a plot of index modulation for a purely apodized grating.
Figure 2A:
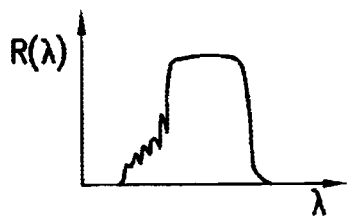
FIG. 2A is a plot of the reflection spectrum for a chirped grating.
Figure 2B:
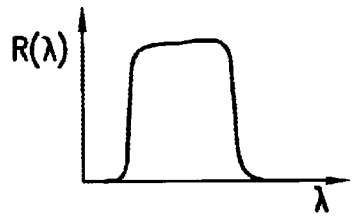
FIG. 2B is a plot of the reflection spectrum for a purely apodized grating.
Figure 3:
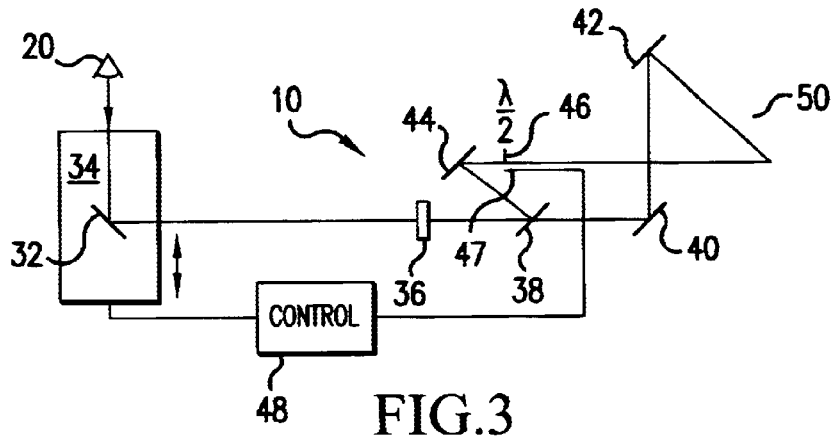
FIG. 3 is a configuration for variation of fringe contrast using polarization control in accordance with the present invention.

In this method, variation in fringe contrast is realized by controlling the relative polarizations of the two interfering beams. A configuration for such control is illustrated in FIG. 3. An interferometer 10 receives light from a light source 20, typically an ultraviolet (UV) source, and provides an interference pattern to a photosensitive optical waveguide or fiber 50 on which the grating is to be provided. The interferometer 10 includes a mirror 32 mounted on a translation stage 34, a cylindrical lens 36, a beam splitter 38, a mirror 40, a mirror 42, a mirror 44, a half-wave plate 46 mounted on a rotation stage 47, and a controller 48.

Light entering the interferometer 10 is directed by the mirror 32 to the cylindrical lens 36 and then to the beam splitter 38. The beam splitter 38 splits the beam into two beams having substantially the same amplitude. The portion of the beam passing through the beam splitter 38 proceeds to the mirror 40 where it is directed to a mirror 42, which directs the beam to the fiber 50. The portion of the beam reflected by the beam splitter 38 is directed to the mirror 44 and through the half-wave plate 46 to the fiber 50. The path lengths of both branches are set to be substantially equal, i.e. the difference therebetween is smaller than the coherence length of the source, so that the only difference in phase between the two beams at the fiber will be due to the half-wave plate 46.

The half-wave plate 46 allows the polarization of the beam in that path to be rotated between 0 and 90°. Obviously, the half-wave plate could be provided in the other path instead of the one shown, or more than one polarization rotator could be employed, as long as the relative polarization between the two beams could be varied between 0 and 90°. When the half-wave plate 46 rotates the beam by 0°, the contrast of the interference pattern should be close to 100%. When the half-wave plate 46 rotates the beam by 90°, the two beams will be orthogonally polarized and will not interfere, resulting in a contrast of 0%. The fringe contrast is the ratio of the AC component to the DC component and is given by C=cos 2θ, where θ is the angle of the birefringent axes of the half-wave plate 46 relative to the input beam from the source 20. Preferably, the input beam is predominantly linearly polarized.

By placing the mirror 32 on a motorized translation stage 34 and the half-wave plate 46 on a motorized rotation stage 47, the controller 48 can scan the beam along the fiber 50. This scanning can be controlled by the controller 48 to produce a substantially uniform average (DC) index change while simultaneously varying the AC component by rotating the half-wave plate 46.

For example, to produce a grating with a Gaussian envelope given by:

$$\Delta n_{AC}(z) = \Delta n_0 e^{-4ln2z^2/\omega^2} \quad (1)$$

where z is the position along the fiber, $\Delta n_0$ is the maximum index change and $\omega$ is the full width at half maximum of the grating. Thus, the contrast C becomes:

$$C(z) = e^{-4ln2z^2/\omega^2} = \cos[2\theta(z)] \quad (2)$$

and $$\theta(z) = \tfrac{1}{2}\cos^{-1}(e^{-4ln2z^2/\omega^2}) \quad (3)$$

Figure 4:
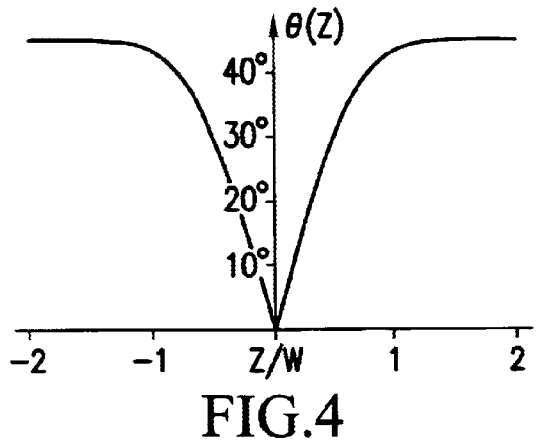
FIG. 4 is a plot of the relationship between position and angle provided by the polarization control in FIG. 3 to produce a Gaussian apodized grating.

The graph in FIG. 4 illustrates how the half-wave plate angle θ varies with the beam position z to produce a Gaussian apodized grating. At z=0, θ=0 which gives 100% contrast. At z=2ω, θ≈45° which rotates the polarization by 90° and gives close to 0% contrast. By controlling z and θ, by controlling the stages 34, 47 using the controller 48 in accordance with the relationship shown in FIG. 4, a Gaussian apodized grating can be produced.

Intensity Control

Figure 5:
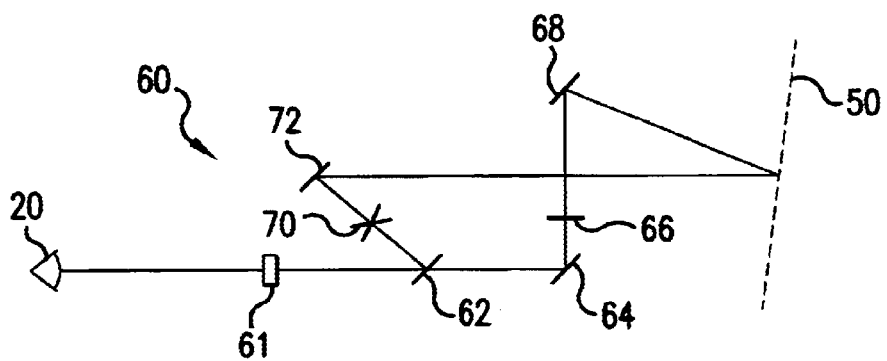
FIG. 5 is a configuration for variation of fringe contrast using relative intensity control in accordance with the present invention.

In this method, variation in fringe contrast is realized by controlling the relative intensities of the two interfering beams. A configuration for such control is illustrated in FIG. 5. An interferometer 60 receives light from a light source 20, typically an ultraviolet (UV) source, and provides an interference pattern to a photosensitive optical waveguide or fiber 50 on which the grating is to be provided. The interferometer 60 includes a cylindrical lens 61, a beam splitter 62, a mirror 64, a mask 66, a mirror 68, a mask 70 and a mirror 72.

Light from the light source 20 is delivered to the cylindrical lens 61 and then to the beam splitter 62. Light passing through the beam splitter 62 impinges on the mirror 64, which directs the light to the mask 66 and then to a mirror 72 which directs the light to the fiber 50. Light reflected by the beam splitter 62 impinges on the mask 70 and then the mirror 72 which directs the light to the fiber. The masks 66, 70 may be placed anywhere in the respective paths. The path lengths of both branches are set to be substantially equal, i.e. the difference therebetween is smaller than the coherence length of the source, so that there is no substantial difference in phase between the two beams at the fiber 50.

For two beams of intensity $I_1$ and $I_2$, the contrast C is:

$$C = \frac{2\sqrt{I_1 I_2}}{I_1 + I_2} \quad (4)$$

The average intensity is simply $(I_1+I_2)/2$. If the grating is to have a substantially uniform DC component, then $I_1+I_2=$ constant$\equiv 1$, resulting in the following relationship between the intensities:

$$I_1 = \tfrac{1}{2}(1 \pm \sqrt{1-C^2})$$

$$I_2 = \tfrac{1}{2}(1 \mp \sqrt{1-C^2}) \quad (5)$$

In order to vary the intensities independently, the two masks 64, 70 are used to spatially filter the two beams by blocking part of the beam incident thereon. The amount of light passed by each mask is related to the other mask as described above, and varies with position. In a binary filter, i.e., a given portion either passes light or blocks light, this variation is achieved by varying the size of the mask opening with position. In the first approximation, the intensity of the beam on the fiber varies as the square of the size of the mask aperture.

Figure 6:
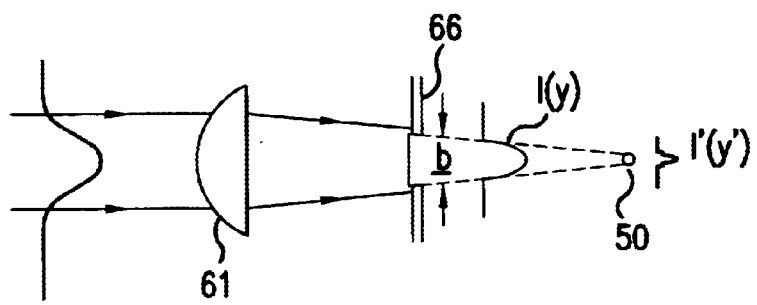
FIG. 6 is a side view illustrating the relationship between the size of the mask opening and the beam profile.

FIG. 6 illustrates a side view, without the beam directing/splitting components of the interferometer 60, of a beam focused on the fiber 50 through the cylindrical lens 61 and a portion of the mask 66 having an opening height b (although equally applicable to the mask 70). The intensity profile I'(y') of the beam in the focal plane of the cylindrical lens 61 is given by the Fourier transform of the beam profile I(y) after the mask 66:

$$I'(y') |F^\vee \overline{I(y)}|^2 \quad (6)$$

For example, if the incident beam has a Gaussian profile, then $$I'(y') = e^{-4ln2y^2/a^2}, \; -\tfrac{b}{2} < y < \tfrac{b}{2} \quad (7)$$

$$= 0, \; |y| \geq \tfrac{b}{2}$$

Where a is the full width at half maximum. The, for y'=0, $$I'(0) \propto erf^2\left(\frac{b}{a}\sqrt{\frac{\ln 2}{2}}\right) = I_0 \quad (8)$$

thus, $$b = a\sqrt{\frac{2}{\ln 2}} \, erf^{-1}\sqrt{I_0} \quad (9)$$

This last equation shows the relationship between the size b of the mask opening and the intensity of the beam on the fiber 50. Equations (5) and (9) gives the sizes for the two masks 66, 70:

$$b_1 = a\sqrt{\frac{2}{\ln 2}} \, erf^{-1}\left(\sqrt{\frac{1}{2}(1 \pm \sqrt{1-C^2})}\right) \quad (10)$$

$$b_2 = a\sqrt{\frac{2}{\ln 2}} \, erf^{-1}\left(\sqrt{\frac{1}{2}(1 \mp \sqrt{1-C^2})}\right)$$

Figure 7A:
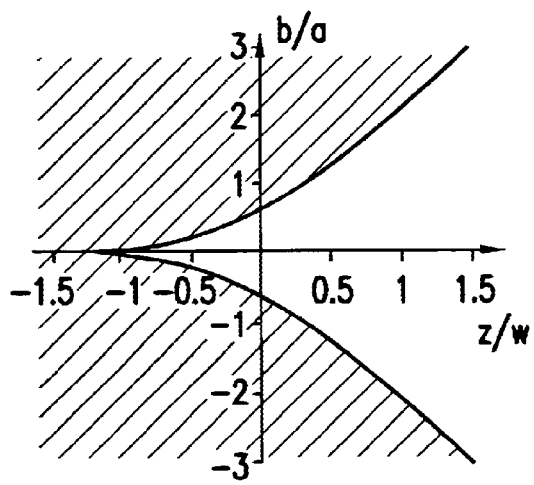
FIGS. 7A and 7B illustrate a pair of masks for creating a Gaussian apodized grating.
Figure 7B:
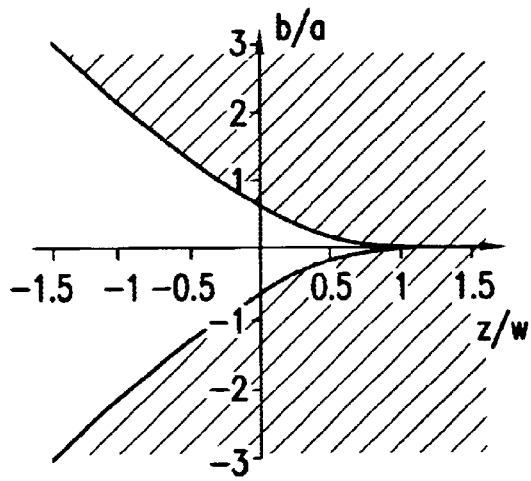

Equation (10) allows an arbitrary contrast function C(z) to be obtained by designing the two masks with varying openings $b_1(z)$ and $b_2(z)$. For the example of a Gaussian apodized grating given in equation (2), the masks will be as shown in FIGS. 7A and 7B, where the cross-hatching indicates blocking portions of the masks and the lack of marking indicates passing portions of the masks. Which masks 66, 70 correspond to these masks does not matter as long as the pair is provided.

Thus, using masks, an apodized grating may be created by illuminating the interferometer 60 with a beam of substantially uniform intensity along z or scanning a small beam across the fiber, for example, using the mirror 30 and the translation stage 32 in FIG. 3, with a substantially constant velocity and a substantially constant intensity.

Figure 8A:
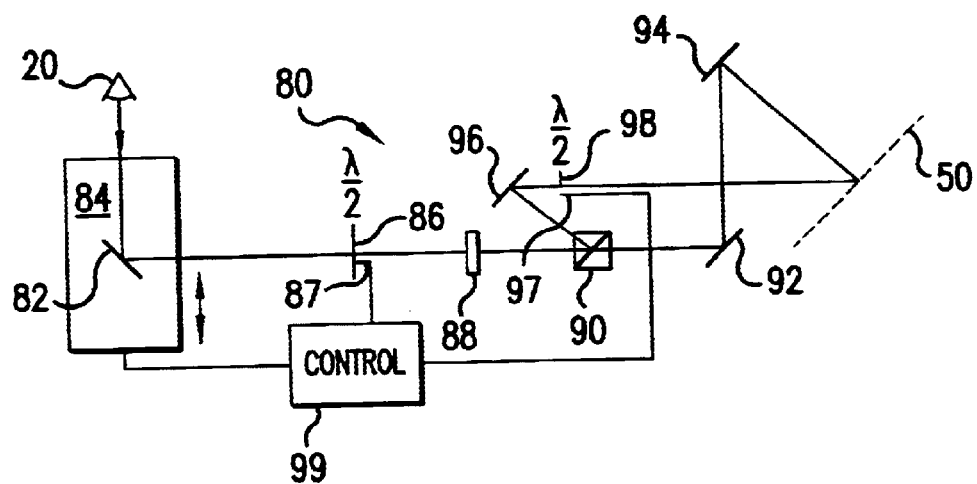
Figure 8A:
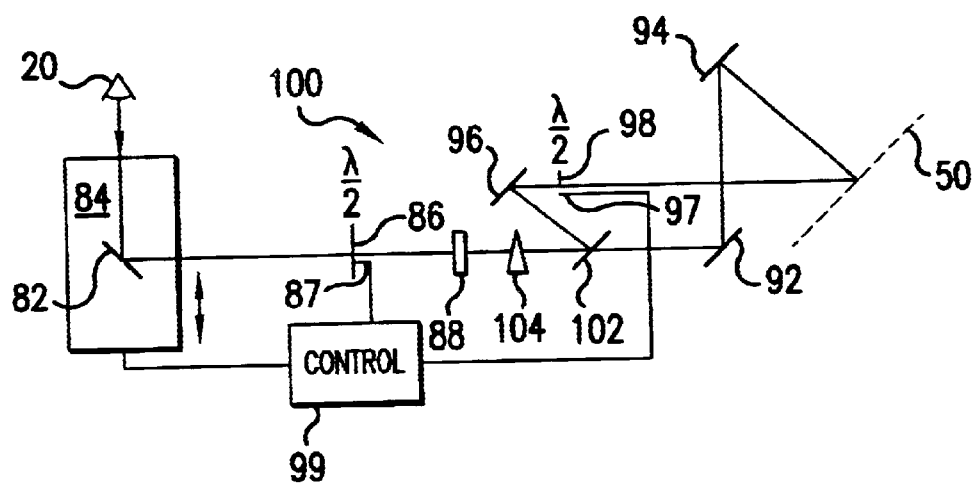

An alternative configuration for relative intensity control is illustrated in FIG. 8A. An interferometer 80 receives light from a light source 20, typically an ultraviolet (UV) source, and provides an interference pattern to a photosensitive optical waveguide or fiber 50 on which the grating is to be provided. The interferometer 80 includes a mirror 82 mounted on a translation stage 84, a half-wave plate 86 mounted on a rotation stage 87, a cylindrical lens 88, a polarizing beam splitter 90, a mirror 92, a mirror 94, a mirror 96, a half-wave plate 98 mounted on a rotation stage 97, and a controller 99.

Light entering the interferometer 80 is directed by the mirror 82 to the half-wave plate 86 and the cylindrical lens 88 and then to the polarized beam splitter 90. The half-wave plate 86 is used to rotate the polarization of the input beam to an arbitrary angle. The polarized beam splitter 90 reflects light at a first polarization and transmits light at a second polarization, orthogonal to the first polarization. Thus, the half-wave plate 86 controls the relative intensities of the reflected and transmitted beams output by the polarizing beam splitter 90.

The portion of the beam passing through the polarizing beam splitter 90 proceeds to the mirror 92 where it is directed to a mirror 94, which in turn directs the beam to the fiber 50. The portion of the beam reflected by the polarizing beam splitter 90 is directed to the mirror 96 and through the half-wave plate 98 to the fiber 50. The half-wave plate 98 rotates the polarization of the beam incident thereon by 90° so that the two beams incident on the fiber 50 have the same polarization, allowing them to interfere with one another. The path lengths of both branches are set to be substantially equal, i.e. the difference therebetween is smaller than the coherence length of the source.

Another alternative embodiment is shown in FIG. 8B, in which the polarizing beam splitter 90 is replaced with an amplitude beam splitter 102 and a birefringent prism 104, 106, one in each branch. Alternatively, a birefringent prism could be placed in each branch, for a total of two separate prisms. Such a configuration would be optically equivalent to the configuration shown in FIG. 8B. While the use of the birefringent prisms does not effectively use all of the available amplitude of the beam, these prisms are more readily available for use with UV. All the other elements remain the same and are indicated by the same reference numerals.

Figure 9:
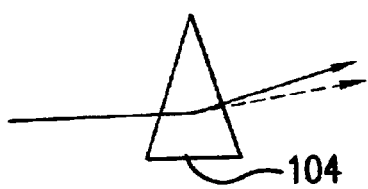
FIG. 9 schematically illustrates the passage of light through a birefringent prism.

Because the prism 104 is birefringent, as illustrated in FIG. 9, the deflection angle of a beam passing through the prism 104 is slightly different for the different orthogonal polarizations. The beam splitter 102 splits the beam from the prism 104 into two beams of substantially equal amplitude. By aligning the interferometer 100 so that for one branch, only a portion of the beam having a first polarization is incident on the fiber 50, while for the other branch, only a portion of the beam having a second polarization orthogonal to the first polarization hits the fiber 50. Clearly, the half-wave plate 98 is provided to rotate one of these beam by 90° so that the beams will interfere at the fiber 50.

For either of the embodiments shown in FIGS. 8A and 8B, in order to obtain a grating with a certain contrast function C(z), a beam is scanned across the fiber using the controller 99 to move the translation stage 34 on which the mirror 32 is mounted and to rotate the rotation stage 87 on which the half-wave plate 86 is mounted to vary the relative intensities of the beam impinging on the fiber 50. Again, the sum of the intensities remains constant and these intensities are determined in accordance with equation (5) above.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A method of fabricating an optical waveguide grating having a refractive index variation comprising:
    providing a photosensitive optical waveguide;
    splitting input light into two beams;
    supplying the two beams to the photosensitive optical waveguide;
    exposing the photosensitive optical waveguide to an interference pattern formed by the supplying of the two beams; and
    varying a fringe contrast of the interference pattern along the photosensitive optical waveguide by altering a relative polarization between beams used to generate the interference pattern.

2. The method of claim 1, wherein said altering includes rotating a polarization of one of the beams used to generate the interference pattern.

3. A method of fabricating an optical waveguide grating having a refractive index variation comprising:

providing a photosensitive optical waveguide;

splitting input light into two beams;

supplying the two beams to the photosensitive optical waveguide;

exposing the photosensitive optical waveguide to an interference pattern formed by the supplying of the two beams; and varying a fringe contrast of the interference pattern along the photosensitive optical waveguide by altering relative intensities of beams used to generate the interference pattern, wherein said altering includes providing a mask having openings with sizes varying with position for each of the beams.

4. The method of claim 3, wherein said providing a mask includes creating a pair of masks includes generating a pair of masks designed to provide a substantially constant total intensity on the optical waveguide.

5. The method according to claim 4, wherein said exposing includes providing a beam of uniform intensity to each of the masks.

6. A method of fabricating an optical waveguide grating having a refractive index variation comprising:

providing a photosensitive optical waveguide;

splitting input light into two beams;

supplying the two beams to the photosensitive optical waveguide;

exposing the photosensitive optical waveguide to an interference pattern formed by the supplying of the two beams; and varying a fringe contrast of the interference pattern along the photosensitive optical waveguide by altering relative intensities of beams used to generate the interference pattern, wherein said varying includes rotating a polarization of an input beam and using a polarizing beam splitter to split the input beam into beams used to generate the interference pattern.

7. The method according to claim 6, further comprising controlling said rotating such that the relative intensities of the beams used to generate the interference patter are related as follows:

$$I_1(z) = \tfrac{1}{2}(1 \pm \sqrt{1-C(z)^2})$$

$$I_2(z) = \tfrac{1}{2}(1 \mp \sqrt{1-C(z)^2})$$

where z is a position along the waveguide, I (z) is the intensity of a beam used to generate the interference pattern at a position z, and C(z) is a desired contrast function.

8. A method of fabricating an optical waveguide grating having a refractive index variation comprising:

providing a photosensitive optical waveguide;

splitting input light into two beams;

supplying the two beams to the photosensitive optical waveguide;

exposing the photosensitive optical waveguide to an interference pattern formed by the supplying of the two beams; and varying a fringe contrast of the interference pattern along the photosensitive optical waveguide by altering relative intensities of beams used to generate the interference pattern, wherein said varying includes rotating a polarization of an input beam, deflecting a portion of the input beam having a first polarization from a portion of the input beam having a second polarization orthogonal to the first polarization, and amplitude splitting the input beam into the beams used to generate the interference pattern.

9. The method according to claim 8, further comprising controlling said rotating such that the relative intensities of the beams used to generate the interference patter are related as follows:

$$I_1(z) = \tfrac{1}{2}(1 \pm \sqrt{1-C(z)^2})$$

$$I_2(z) = \tfrac{1}{2}(1 \mp \sqrt{1-C(z)^2})$$

where z is a position along the waveguide, I (z) is the intensity of a beam used to generate the interference pattern at a position z, and C(z) is a desired contrast function.

10. A method of fabricating an optical waveguide grating having a refractive index variation comprising:

providing a photosensitive optical waveguide;

splitting input light into two beams;

supplying the two beams to the photosensitive optical waveguide;

exposing the photosensitive optical waveguide to an interference pattern formed by the supplying of the two beams; and varying a fringe contrast of the interference pattern along the photosensitive optical waveguide by altering relative intensities of beams used to generate the interference pattern, wherein said exposing includes scanning a beam along the photosensitive optical waveguide.

11. The method according to claim 10, wherein said varying includes altering a relative polarization between beams used to generate the interference pattern simultaneously with said scanning to generate a desired grating.

12. An apparatus for fabricating an optical waveguide grating comprising:

a splitter which splits input light into two beams to be delivered to an optical waveguide to form an interference pattern thereon; and a fringe contrast varying system which alters a fringe contrast of the interference pattern along the optical waveguide to create a desired contrast function, wherein said fringe contrast varying system comprises:

a scanner which scans the input light along the optical waveguide;

a rotatable polarizer which alters a polarization of one of the two beams relative to the other; and a controller which adjusts a polarization presented by the rotatable polarizer in accordance with the position of the input light and the desired contrast function.

13. The apparatus according to claim 12, wherein said fringe contrast varying system comprises:

a scanner which scans the input beam along the optical waveguide;

a rotatable polarizer which alters a polarization of the input beam; and a controller which adjusts a polarization presented by the rotatable polarizer in accordance with the position of the input light and the desired contrast function, wherein said splitter is a polarizing beam splitter.

14. The apparatus according to claim 12, wherein said splitter splits the input light into two beams of substantially equal amplitude and said fringe contrast varying system comprises:

a scanner which scans the input beam along the optical waveguide;

- a deflector which alters the optical path traversed by a portion of the input beam having a first polarization from a portion of the input beam having a second polarization, orthogonal to the first polarization;
- a rotatable polarizer which alters a polarization of the input beam; and
- a controller which adjusts a polarization presented by the rotatable polarizer in accordance with the position of the input light and the desired contrast function.

15. The apparatus according to claim 12, wherein said fringe contrast varying system comprises a pair of masks, one mask for each of the two beams, the masks providing a varying opening size along the optical waveguide, a total intensity output by the pair of masks being substantially constant.

16. The apparatus according to claim 15, wherein said fringe contrast varying system further comprises a scanner which scans the input light along the optical waveguide.

17. The apparatus according to claim 15, wherein the input light has a uniform intensity along the optical waveguide.

* * * * *